(12) United States Patent
Jang et al.

(10) Patent No.: US 7,288,903 B2
(45) Date of Patent: Oct. 30, 2007

(54) DRIVING DEVICE OF LIGHT SOURCE FOR DISPLAY DEVICE

(75) Inventors: Hyeon-Yong Jang, Gyeonggi-do (KR); Nam-Ok Kwon, Seoul (KR); Min-Gyu Kim, Seoul (KR)

(73) Assignee: Samsung Electronics Co., Ltd., Suwon-Si, Gyeonggi-do (KR)

( * ) Notice: Subject to any disclaimer, the term of this patent is extended or adjusted under 35 U.S.C. 154(b) by 76 days.

(21) Appl. No.: 11/126,431

(22) Filed: May 10, 2005

(65) Prior Publication Data

US 2005/0269973 A1 Dec. 8, 2005

(30) Foreign Application Priority Data

May 13, 2004 (KR) ............... 10-2004-0033880

(51) Int. Cl.
G05F 1/00 (2006.01)
(52) U.S. Cl. ............... 315/307; 315/312; 345/102
(58) Field of Classification Search ........ 315/307–308, 315/209 R, 291, 312, 224, 276, 277, 324; 345/76, 77, 102
See application file for complete search history.

(56) References Cited

U.S. PATENT DOCUMENTS

| | | | | |
|---|---|---|---|---|
| 4,698,554 | A * | 10/1987 | Stupp et al. | 315/307 |
| 6,100,653 | A * | 8/2000 | Lovell et al. | 315/307 |
| 6,239,558 | B1 * | 5/2001 | Fujimura et al. | 315/307 |
| 6,469,922 | B2 | 10/2002 | Choi | 363/133 |
| 6,509,696 | B2 | 1/2003 | Bruning | 315/246 |
| 6,515,427 | B2 | 2/2003 | Oura | 315/141 |
| 7,045,967 | B2 * | 5/2006 | Chen et al. | 315/224 |
| 7,095,180 | B2 * | 8/2006 | Emslie et al. | 315/161 |
| 2003/0155873 | A1 * | 8/2003 | O'Meara | 315/312 |
| 2004/0004450 | A1 * | 1/2004 | Hsu et al. | 315/291 |

(Continued)

FOREIGN PATENT DOCUMENTS

JP 10-284282 10/1998

(Continued)

OTHER PUBLICATIONS

English Language Abstract. KR Patent First Publication No. 2002-0072948, Sep. 19, 2002, 1 page.

(Continued)

*Primary Examiner*—Trinh Dinh
*Assistant Examiner*—Tung Le
(74) *Attorney, Agent, or Firm*—MacPherson Kwok Chen & Heid LLP

(57) ABSTRACT

A driving device of a light source for a display device is provided. The light source includes a plurality of lamps connected in parallel to each other and each lamp has a first terminal and a second terminal. The driving device also includes a lamp state sensing unit sensing driving voltages applied to the respective lamps, comparing the sensed driving voltages to a reference voltage, and outputting a lamp state sensing signal having an information informing an over-current state for at least one lamp; and an inverter turning the lamps on or off by applying an AC voltage to the lamps and controlling the AC voltage based on the lamp state sensing signal. The reference voltage is varied depending on the magnitude of the driving voltages applied to the respective lamps.

22 Claims, 6 Drawing Sheets

U.S. PATENT DOCUMENTS

| | | | |
|---|---|---|---|
| 2004/0100438 A1* | 5/2004 | Lee et al. | 345/102 |
| 2004/0113565 A1* | 6/2004 | Fushimi | 315/276 |
| 2004/0155596 A1* | 8/2004 | Ushijima et al. | 315/224 |
| 2005/0078080 A1* | 4/2005 | Kang et al. | 345/102 |
| 2006/0097666 A1* | 5/2006 | Venkitasubrahmanian et al. | 315/312 |
| 2006/0139013 A1* | 6/2006 | Yoo et al. | 323/201 |

FOREIGN PATENT DOCUMENTS

| | | |
|---|---|---|
| JP | 2001-244094 | 9/2001 |
| JP | 2002-313593 | 10/2002 |
| KR | 2002-0072948 | 9/2002 |
| KR | 2002-0365956 | 12/2002 |
| KR | 2003-0065219 | 8/2003 |
| KR | 2003-0075571 | 9/2003 |

OTHER PUBLICATIONS

English Language Abstract, KR Patent First Publication No. 2002-036956, Dec. 26, 2002, 1 page.

English Language Abstract, KR Patent First Publication No. 2003-0065219, Aug. 6, 2003, 2 pages.

English Language Abstract, KR Patent First Publication No. 20030075571, Sep. 26, 2003, 2 pages.

English Language Abstract, JP Patent First Publication No. 10-284282, Oct. 23, 1998, 1 page.

English Language Abstract, JP Patent First Publication No. 2001-244094, Sep. 7, 2001, 1 page.

English Language Abstract, JP Patent First Publication No. 2002-313593, Oct. 25, 2002, 1 page.

* cited by examiner

DRIVING DEVICE OF LIGHT SOURCE FOR DISPLAY DEVICE

The present application claims priority from Korean Patent Application No. 2004-0033880, filed on May 13, 2004, the disclosure of which is hereby incorporated herein by reference in its entirety.

BACKGROUND OF THE INVENTION (a) Field of the Invention

The present invention relates to a driving device of a light source for a display device.

(b) Description of Related Art

Display devices used for monitors of computers and television sets generally include self-emitting display devices such as organic light emitting displays (OLEDs), vacuum fluorescent displays (VFDs), field emission displays (FEDs), and plasma panel displays (PDPs), and non-emitting display devices such as liquid crystal displays (LCDs) requiring external light source.

An LCD includes two panels provided with field-generating electrodes and a liquid crystal (LC) layer having dielectric anisotropy and interposed therebetween. The field-generating electrodes that are supplied with electric voltages generate electric field across the LC layer, and the light transmittance of the liquid crystal layer varies depending on the strength of the applied field, which can be controlled by the applied voltages. Accordingly, desired images are displayed by adjusting the applied voltages.

The light for an LCD is provided by lamps equipped at the LCD or may be a natural light.

When lamps are used, the brightness on a screen of the LCD is usually adjusted by adjusting the ratio of on and off durations of the lamps or adjusting the current flowing through the lamps.

The artificial light source, which is part of a backlight assembly, is often implemented as a plurality of fluorescent lamps such as CCFL (cold cathode fluorescent lamp) and EEFL (external electrode fluorescent lamp) driven by an inverter. The inverter converts a DC voltage into an AC voltage and applies the AC voltage to the lamps to be turned on. The inverter adjusts luminance of the lamps based on a luminance control signal to control the luminance of the LCD. In addition, an inverter feedback controls the voltages applied to the lamps based on the currents of the lamps.

For controlling a plurality of CCFLs, the backlight assembly also includes a plurality of transformers connected to the lamps to apply a high voltage to a hot electrode of each CCFL, and a resistor sensing currents flowing through the CCFLs and connected between cold electrodes of the CCFLs and a ground. The sensed current is relative to the total current flowing through the cold electrode of each CCFL. Thus, the operating states of the CCFLs are not exactly determined in using the sensed current.

In general, as the voltage become higher the leakage current increases. Thus, the leakage current being occurred on the hot electrode is more than that on the cold electrode, thereby the difference between leakage currents on hot electrode and the cold electrode becomes large. The leakage current difference brings an imbalance in luminance of lamps and deterioration of the image quality.

Since a separate transformer is required for controlling each lamp, the volume and the manufacturing cost of the backlight assembly become enlarged.

SUMMARY OF THE INVENTION

A driving device of a light source for a display device is provided, the light source including a plurality of lamps connected in parallel to each other and each lamp having a first terminal and a second terminal, which includes: a lamp state sensing unit sensing driving voltages applied to the respective lamps, comparing the sensed driving voltages to a reference voltage, and outputting a lamp state sensing signal having an information informing an over-current state for at least one lamp; and an inverter turning the lamps on or off by applying AC voltages to the lamps and controlling the AC voltages based on the lamp state sensing signal, wherein the reference voltage is defined based on one of the AC voltages from the inverter and is varied depending on a magnitude of one of the AC voltages applied to the respective lamps.

The inverter may include: a first transformer applying a first AC voltage of the AC voltages to the first terminals of the lamps; and a second transformer applying a second AC voltage of the AC voltages to the second terminals of the lamps, wherein the first AC voltage has a phase inverted to that of the second AC voltage.

The first and second AC voltages may have the same magnitude.

The device may further include: a plurality of first capacitors connected between the first transformer and the first terminals of the respective lamps; and a plurality of second capacitors connected between the second transformer and the second terminals of the respective lamp, the first and second capacitors are ballast capacitors.

The device may further include: a current sensing unit connected between the first transformer and the second transformer and applying a current sensing signal having a value dependent on an induced voltage induced by the first transformer of the inverter, wherein the inverter adjusts the AC voltages applied to lamps based on the current sensing signal from the current sensing unit.

The current sensing unit may include a rectifier connected to the first transformer and a resistor connected between the rectifier and a ground node.

The lamp state sensing unit may include: a reference voltage setting unit connected to the second transformer and defining the reference voltage of which the magnitude is varied depending on an average voltage of the AC voltage applied to the lamps; and a plurality of lamp state sensing circuits connected to the respective lamps, comparing the sensed driving voltages of the lamps, of which the magnitude is varied depending on the driving voltages applied to the respective lamps, to the reference voltage, and outputting a plurality of state signals having an information informing the over-current state when the sensed driving voltage is smaller than the reference voltage, respectively.

The reference voltage setting unit may include: a first voltage divider dividing the second AC voltage; a first rectifier rectifying the second AC voltage divided by the first voltage divider and converting it to the DC voltage; and a first capacitor smoothing the DC voltage rectified by the first rectifier and outputting it as the reference voltage.

Each lamp state sensing circuit may include: a second voltage divider dividing the driving voltage applied to each lamp; a second rectifier rectifying the driving voltage divided by the second voltage divider to convert it to a DC voltage; and a comparator receiving the reference voltage from the first capacitor and the DC voltage from the second rectifier.

The respective lamp state sensing circuits may have output terminals connected to a common terminal, and the lamp state sensing signal is outputted through the common terminal.

The inverter shuts off the AC voltages applied to the lamps when an over-current flows through the at least one lamp.

A driving device of a lamp unit for a display device is provided, the lamp unit including a plurality of lamps connected in parallel to each other, which includes: an inverter applying an AC voltage to the lamps and turning on or off the lamps; a plurality of lamp voltage sensing units sensing a plurality of driving voltages applied to the respective lamps, respectively; a reference voltage generator commonly connected to the lamps and generating a reference voltage based on an average voltage of the AC voltages applied to the respective lamps; and a plurality of comparators comparing the reference voltage to a plurality of output voltages from the respective lamp voltage sensing units and outputting a comparison result to the inverter.

The respective comparators may have output terminals and the output terminals have a wired-OR connection.

A driving device of a lamp unit for a display device is provided, the lamp unit including a plurality of lamps connected in parallel to each other, and each lamp having a first terminal and a second terminal, the device includes: an inverter applying a first AC voltage and a second AC voltage to the first terminals and the second terminals of lamps, respectively and controlling the lamps; a plurality of first voltage divider connected to the second terminals of the respective lamps; a plurality of first AC-DC converter connected to the first voltage dividers, respectively; a second voltage divider commonly connected to the second terminals of the lamps; a second AC-DC converter connected to the second voltage divider; and a plurality of comparators having a first input terminal connected to the respective one of the first AC-DC converters and a second input terminal connected to the second AC-DC converter, and the plurality of comparators applying an output voltage to the inverter, wherein the inverter controls turning on or off of the lamps depending to the output voltage of the comparators.

The respective comparators may have output terminals and the output terminals may have a wired-OR connection.

The inverter may include a first transformer generating the first AC voltage and a second transformer generating the second AC voltage.

The first AC voltage may have a phase inverted to that of the second AC voltage and the first AC voltage may have a magnitude equal to that of the second AC voltage.

The device may further include: a current sensing unit connected between the first transformer and the second transformer, wherein the inverter may adjust the first and second AC voltages based on an output from the current sensing.

The current sensing unit may include a diode connected to the first transformer and a resistor connected to the diode.

The device may further include a plurality of first and second capacitors connected to lamps, respectively.

The first and second AC-DC converters may respectively include a diode connected to the respective first or the second voltage divider; and a capacitor connected to the diode.

BRIEF DESCRIPTION OF THE DRAWINGS

The present invention will become more apparent by describing preferred embodiments thereof in detail with reference to the accompanying drawings in which.

DETAILED DESCRIPTION OF EMBODIMENTS

Figure 1:
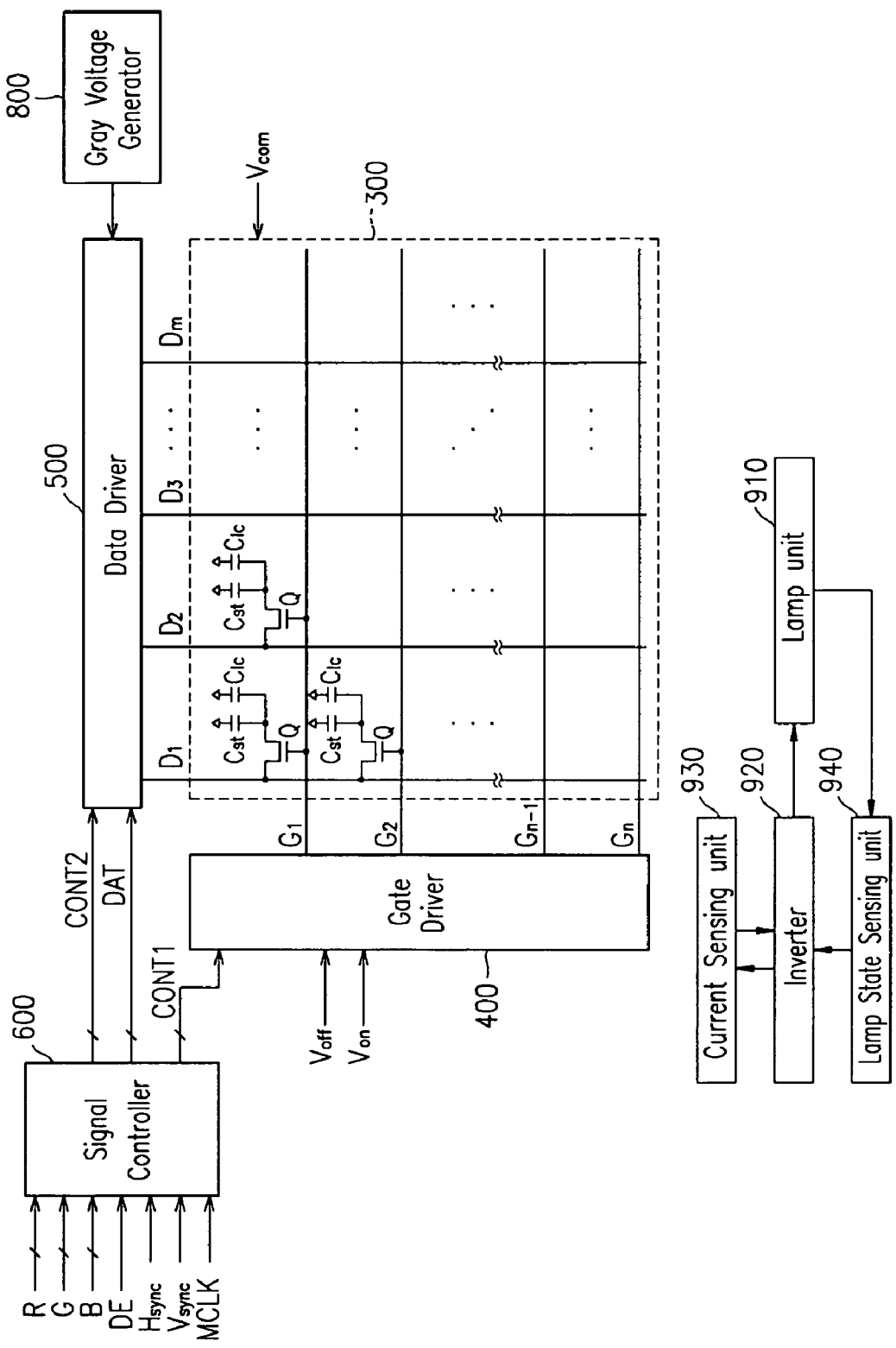
FIG. 1 is a block diagram of an LCD according to an embodiment of the present invention.

The present invention will now be described more fully hereinafter with reference to the accompanying drawings, in which preferred embodiments of the inventions invention are shown.

In the drawings, the thickness of layers and regions are exaggerated for clarity. Like numerals refer to like elements throughout. It will be understood that when an element such as a layer, film, region, substrate or panel is referred to as being "on" another element, it can be directly on the other element or intervening elements may also be present. In contrast, when an element is referred to as being "directly on" another element, there are no intervening elements present.

Then, a driving device of a light source for a display device according to embodiments of the present invention will be described with reference to the accompanying drawings.

A liquid crystal display according to an embodiment of the present invention is described in detail with reference to FIGS. 1–3.

Figure 2:
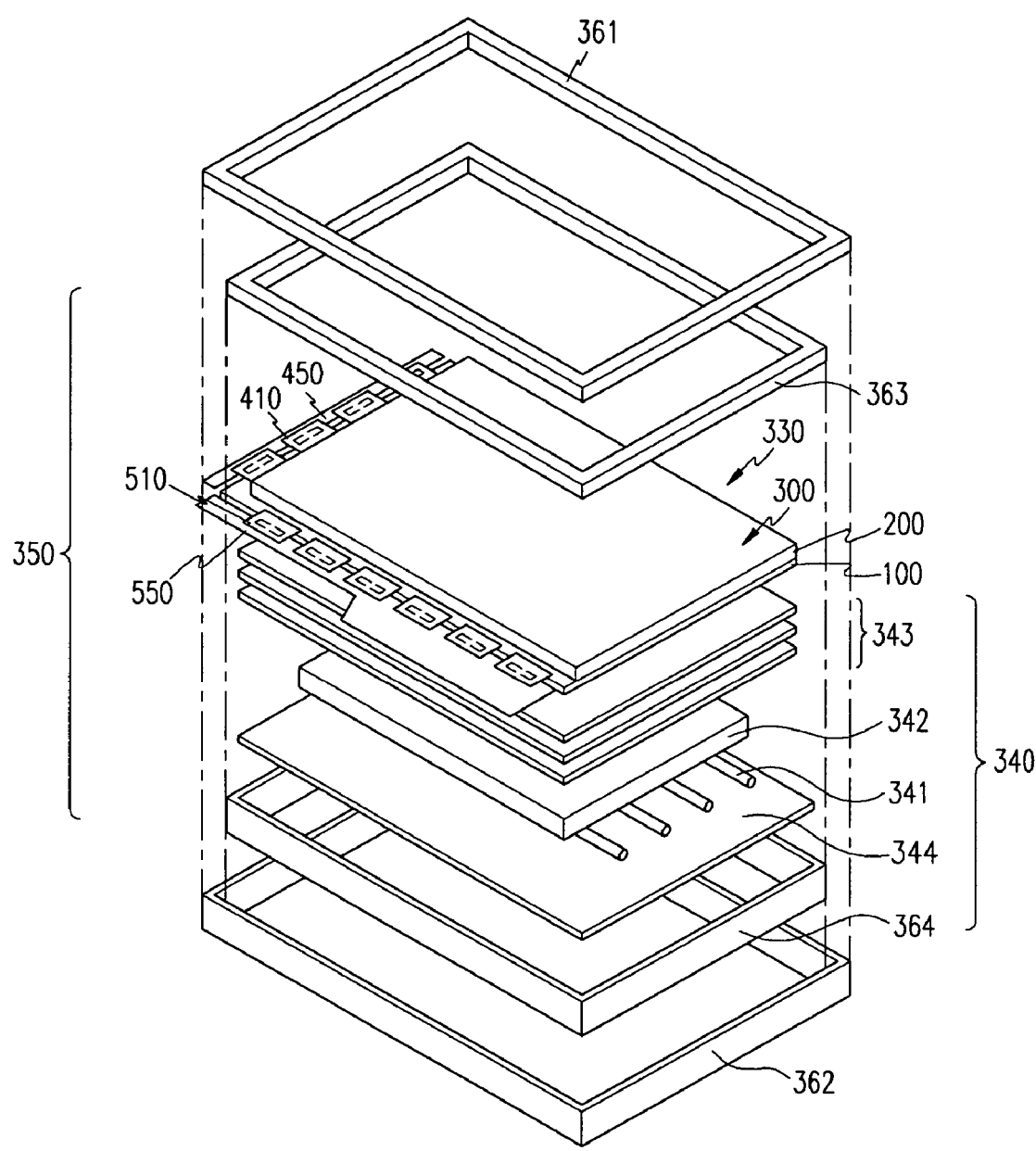
FIG. 2 is an exploded perspective view of the LCD shown in FIG. 1.
Figure 3:
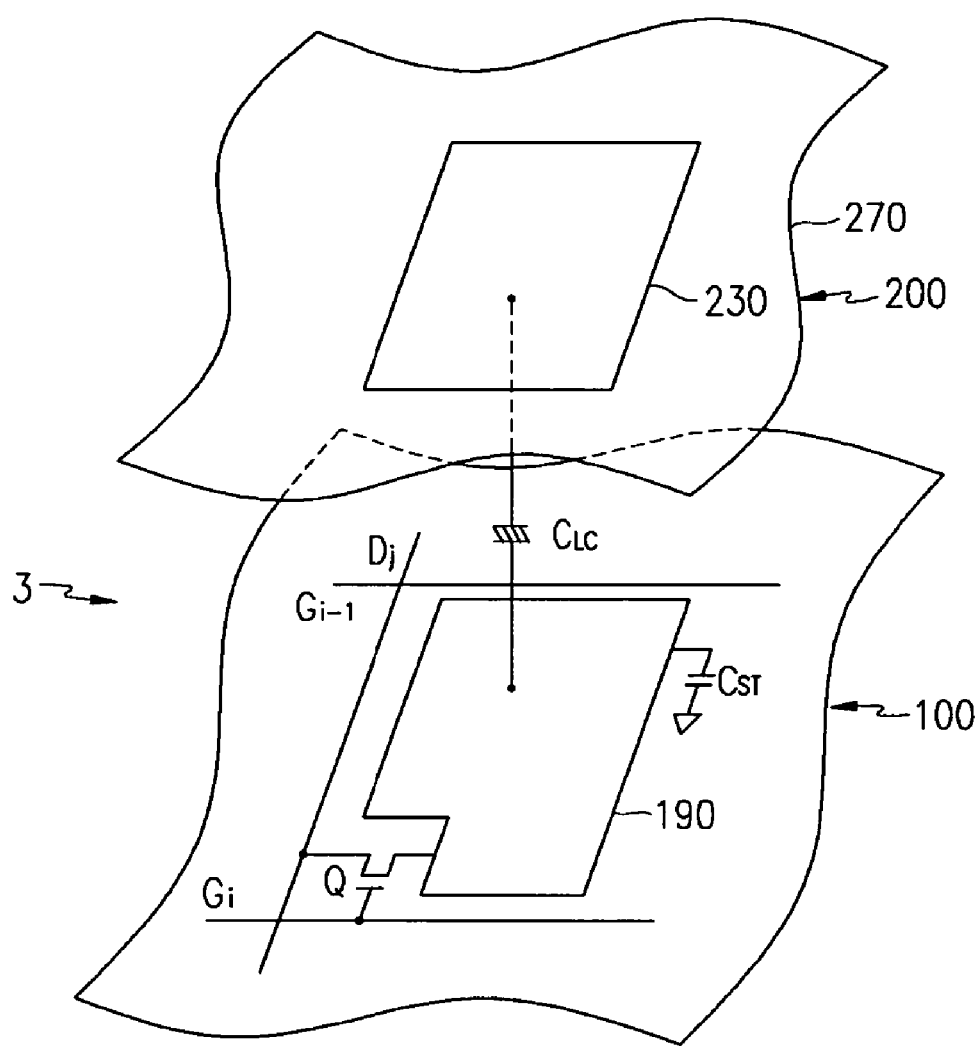
FIG. 3 is an equivalent circuit diagram of a pixel of the LCD shown in FIG. 1.

FIG. 1 is a block diagram of an LCD according to an embodiment of the present invention, FIG. 2 is an exploded perspective view of the LCD shown in FIG. 1, and FIG. 3 is an equivalent circuit diagram of a pixel of the LCD shown in FIG. 1.

Referring to FIG. 1, an LCD according to an embodiment of the present invention includes a LC panel assembly 300, a gate driver 400 and a data driver 500 connected to the LC panel assembly 300, a gray voltage generator 800 connected to the data driver 500, a lamp unit 910 emitting light toward the LC panel assembly 300 and an inverter 920 connected to the lamp unit 910, a current sensing unit 930 connected to the inverter 920, a lamp state sensing unit 940 connected between the lamp unit 910 and the inverter 920, and a signal controller 600 controlling the above-described elements.

As shown in FIG. 2, the LCD according to an embodiment of the present invention includes an LC module 350 including a display unit 330 and the backlight assembly 340, a pair of front and rear chassis 361 and 362 containing and fixing the LC module 350, and mold frame 364.

The display unit 3300 includes the LC panel assembly 300, a plurality of gate tape carrier packages (TCPs) 410 and a plurality of data TCPs 510 attached to the LC panel assembly 300, and a gate printed circuit board (PCB) 450 and a data PCB 550 attached to the associated TCPs 410 and 510, respectively.

The display panel assembly 300 includes a lower panel 100, an upper panel 200, and a liquid crystal layer 3 interposed therebetween as shown in FIG. 3. The display panel assembly 300 includes a plurality of display signal lines G1–Gn and D1–Dm and a plurality of pixels connected thereto and arranged substantially in a matrix in circuital view as shown in FIGS. 1 and 3.

The display signal lines G1–Gn and D1–Dm are disposed on the lower panel 100 and include a plurality of gate lines G1–Gn transmitting gate signals (also referred to as "scanning signals") and a plurality of data lines D1–Dm transmitting data signals. The gate lines G1–Gn extend substantially in a row direction and are substantially parallel to each other, while the data lines D1–Dm extend substantially in a column direction and are substantially parallel to each other.

Each pixel includes a switching element Q connected to the display signal lines G1–Gn and D1–Dm, and an LC capacitor $C_{LC}$ and a storage capacitor $C_{ST}$ that are connected to the switching element Q. The storage capacitor $C_{ST}$ is optional and may be omitted in other embodiments.

The switching element Q that may be implemented as a TFT is disposed on the lower panel 100. The switching element Q has three terminals: a control terminal connected to one of the gate lines G1–Gn; an input terminal connected to one of the data lines D1–Dm; and an output terminal connected to the LC capacitor $C_{LC}$ and the storage capacitor $C_{ST}$.

The LC capacitor $C_{LC}$ includes a pixel electrode 190 provided on the lower panel 100 and a common electrode 270 provided on an upper panel 200 as two terminals. The LC layer 3 disposed between the two electrodes 190 and 270 functions as dielectric of the LC capacitor $C_{LC}$. The pixel electrode 190 is connected to the switching element Q, and the common electrode 270 is supplied with a common voltage Vcom and covers an entire surface of the upper panel 200. In other embodiments, the common electrode 270 may be provided on the lower panel 100, and both electrodes 190 and 270 may have shapes of bars or stripes.

The storage capacitor $C_{ST}$ is an auxiliary capacitor for the LC capacitor $C_{LC}$. The storage capacitor $C_{ST}$ includes the pixel electrode 190 and a separate signal line, which is provided on the lower panel 100, overlaps the pixel electrode 190 via an insulator, and is supplied with a predetermined voltage such as the common voltage Vcom. Alternatively, the storage capacitor $C_{ST}$ includes the pixel electrode 190 and an adjacent gate line called a previous gate line, which overlaps the pixel electrode 190 via an insulator.

For color display, each pixel uniquely represents one of primary colors (i.e., spatial division) or each pixel sequentially represents the primary colors in turn (i.e., temporal division) such that spatial or temporal sum of the primary colors are recognized as a desired color. An example of a set of the primary colors includes red, green, and blue colors. FIG. 3 shows an example of the spatial division that each pixel includes a color filter 230 representing one of the primary colors in an area of the upper panel 200 facing the pixel electrode 190. Alternatively, the color filter 230 is provided on or under the pixel electrode 190 on the lower panel 100.

The backlight assembly 340 includes a plurality of lamps 341 disposed behind the LC panel assembly 300, a spread plate 342 and optical sheets 343 disposed between the panel assembly 300 and the lamps 341. The spread plate 342 guides and diffuses light from the lamps 341 to the panel assembly 300. The backlight unit also includes a reflector 344 disposed under the lamps 341 and reflecting the light from the lamps 341 toward the panel assembly 300 and mold frames 345 and 363 disposed between the reflector 344 and the spread plate 342, supporting the spread plate 342 and the optical sheets 343, and uniformly maintaining a distance between the lamps 341 and the spread plate 342.

The lamps 341 are EEFL (external electrode fluorescent lamp), but may be CCFL (cold cathode fluorescent lamp) or LED (light emitting diode). In the present embodiment, the number of the lamps 341 is four. Other number of lamps may be used as determined by the operation of the LCD.

Moreover, the lamps is disposed under an LC panel assembly 300, such as in a direct-type backlight assembly, or may be disposed along one or more edges of the LC panel assembly 300 such as in an edge-type backlight assembly. The edge-type backlight assembly includes a light guide plate instead of the spread plate 342.

The inverter 920 may be mounted on a stand-alone inverter PCB (not shown), on the gate PCB 450 or the data PCB 550. The current sensing unit 930 and the lamp state sensing unit 940 also may be constructed as a separate device and mounted on the inverter PCB, but may also be integrated in another device.

One or more polarizers (not shown) for polarizing the light from the lamp 341 are attached to the outer surfaces of the panels 100 and 200.

Referring to FIGS. 1 and 2, the gray voltage generator 800 on the data PCB 550 generates two sets of gray voltages related to the transmittance of the pixels. The gray voltages in one set have a positive polarity with respect to the common voltage Vcom, while those in the other set have a negative polarity with respect to the common voltage Vcom.

The gate driver 400 includes a plurality of integrated circuit (IC) chips mounted on the respective gate TCPs 410. The gate driver 400 is connected to the gate lines G1–Gn of the panel assembly 300 and synthesizes the gate-on voltage Von and the gate off voltage Voff from an external device to generate gate signals for application to the gate lines G1–Gn.

The data driver 500 includes a plurality of IC chips mounted on the respective data TCPs 510. The data driver 500 is connected to the data lines D1–Dm of the panel assembly 300 and applies data voltages selected from the gray voltages supplied from the gray voltage generator 800 to the data lines D1–Dm.

According to another embodiment of the present invention, the IC chips of the gate driver 400 or the data driver 500 are mounted on the lower panel 100. According to another embodiment, one or both of the drivers 400 and 500 are incorporated along with other elements into the lower panel 100. The gate PCB 450 and/or the gate TCPs 410 may be omitted in such embodiments.

The signal controller 600 controlling the drivers 400 and 500, etc. is disposed on the data PCB 550 or the gate PCB 450.

Now, the operation of the LCD will be described in detail with reference to FIGS. 1 to 3.

Referring to FIG. 1, the signal controller 600 is supplied with input image signals R, G and B and input control signals controlling the display thereof such as a vertical synchronization signal Vsync, a horizontal synchronization signal Hsync, a main clock MCLK, and a data enable signal DE, from an external graphics controller (not shown). After generating gate control signals CONT1 and data control signals CONT2 and processing the image signals R, G and B suitable for the operation of the panel assembly 300 on the basis of the input control signals and the input image signals R, G and B, the signal controller 600 provides the gate control signals CONT1 to the gate driver 400, and the processed image signals DAT and the data control signals CONT2 for the data driver 500.

The gate control signals CONT1 include a scanning start signal STV for instructing the gate driver 400 to start scanning and at least a clock signal for controlling the output time of the gate-on voltage Von. The gate control signals CONT1 may further include an output enable signal OE for defining the duration of the gate-on voltage Von.

The data control signals CONT2 include a horizontal synchronization start signal STH for informing of start of data transmission for a group of pixels, a load signal LOAD for instructing the data driver 500 to apply the data voltages to the data lines D1–Dm, and a data clock signal HCLK The data control signal CONT2 may further include an inversion signal RVS for reversing the polarity of the data voltages (with respect to the common voltage Vcom).

Responsive to the data control signals CONT2 from the signal controller 600, the data driver 500 receives a packet of the image data DAT for the group of pixels from the signal controller 600, converts the image data DAT into analog data voltages selected from the gray voltages supplied from the gray voltage generator 800, and applies the data voltages to the data lines D1–Dm.

The gate driver 400 applies the gate-on voltage Von to the gate line $G_1$–$G_n$ in response to the gate control signals CONT1 from the signal controller 600, thereby turning on the switching elements Q connected thereto. The data voltages applied to the data lines D1–Dm are supplied to the pixels through the activated switching elements Q.

The difference between the data voltage and the common voltage Vcom applied to a pixel is expressed as a charged voltage of the LC capacitor $C_{LC}$, i.e., a pixel voltage. The liquid crystal molecules have orientations depending on the magnitude of the pixel voltage.

The inverter 920 converts a DC voltage from an external source into an AC voltage and applies the AC voltage to the lamp unit 910, to light the lamp unit 910. The brightness of the lamp unit 910 is controlled based on the AC voltages. The inverter 920 generates the AC voltages to control the lamp unit 910 based on two control signals. First, the inverter 920 receives a signal Is indicative of the currents applied to the lamp unit 910. The signal Is is generated by the current sensing unit 930. Second, the inverter 920 receives a signal Ip indicative of the current flowing through the lamp unit 910. The signal Ip is generated by the lamp state sensing unit 940.

The light from the lamp unit 910 passes through the LC layer 3 and experiences a change of its polarization. The change of the polarization is converted into that of the light transmittance by the polarizers.

By repeating this procedure by a unit of the horizontal period (which is denoted by "1H" and equal to one period of the horizontal synchronization signal Hsync and the data enable signal DE), all gate lines $G_1$–$G_n$ are sequentially supplied with the gate-on voltage Von during a frame, thereby applying the data voltages to all pixels. When the next frame starts after finishing one frame, the inversion control signal RVS applied to the data driver 500 is controlled such that the polarity of the data voltages is reversed (which is referred to as "frame inversion"). The inversion control signal RVS may be also controlled such that the polarity of the data voltages flowing in a data line in one frame is reversed (for example, line inversion and dot inversion), or the polarity of the data voltages in one packet are reversed (for example, column inversion and dot inversion).

Now, the lamp unit 910, the inverter 920, the current sensing unit 930 and the lamp state sensing unit 940 according to an embodiment of the present invention will be described in detail with reference to FIG. 4.

Figure 4:
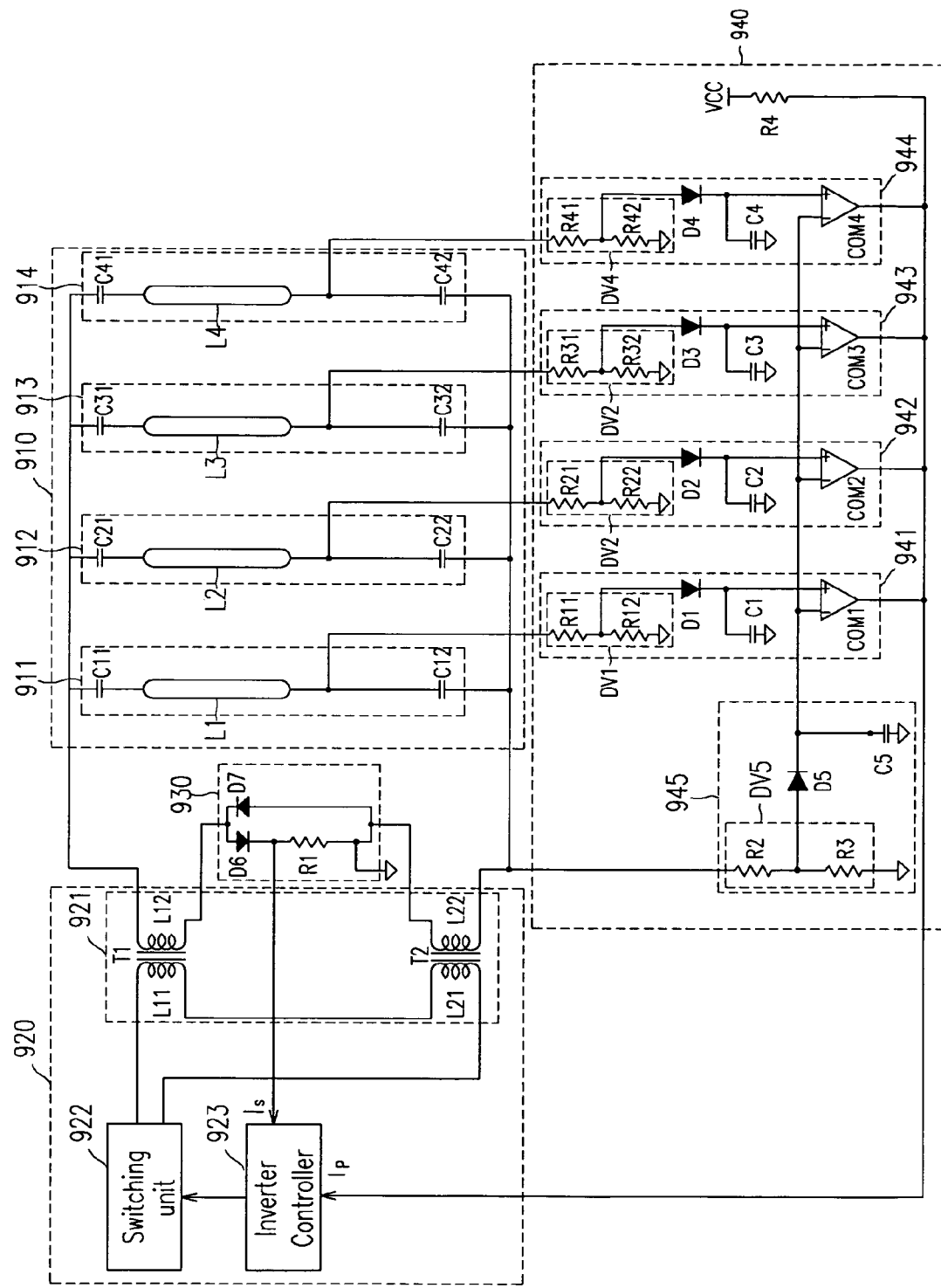
FIG. 4 is a circuit diagram of a lamp unit, an inverter, a current sensing unit and a lamp state sensing unit according to an embodiment of the present invention.

FIG. 4 is a circuit diagram of a lamp unit, an inverter, a current sensing unit and a lamp state sensing unit according to an embodiment of the present invention.

Referring to FIG. 4, the lamp unit 910 includes a plurality of lamp devices 911–914 which have substantially the same configuration each other. Each lamp device 911–914 includes a lamp L1–L4, a pair of capacitors C11 and C12, C21 and C22, C31 and C32, and C41 and C42 connected to both ends of the lamp L1–L4. The capacitors C11, C21, C31 and C41 are connected to each other and the capacitors C12, C22, C32 and C42 are connected to each other, too.

The capacitors C11 and C12, C21 and C22, C31 and C32, and C41 and C42 are ballast capacitor and the lamps L1–L4 are CCFL.

The inverter 920 includes a transforming unit 921, a switching unit 922 connected to the transforming unit 921, and an inverter controller 923 connected to the switching unit 922.

The transforming unit 921 has two transformers T1 and T2, which include a primary coil L11 and L21, and a secondary coil L12 and L22, respectively. One terminal of each primary coil L11 and L21 is connected to the switching unit 922 and the other terminals of each primary coil L12 and L22 are connected to each other. One terminal of each secondary coil L12 and L22 is connected to the current sensing unit 930. In addition, the other terminal of the secondary coil L12 of transformer T1 are commonly connected to the capacitors C11, C21, C31, and C41, and the other terminal of the secondary coil L22 of transformer T2 is commonly connected to the capacitors C12, C22, C32, and C42.

The current sensing unit 930 includes a pair of diodes D6 and D7 and a resistor R1 of which one terminal is connected to the diode D6 in a forward direction and the other terminal is connected to a ground node and the secondary coil L22 of transformer T2.

The diodes D6 and D7 are connected in parallel between the secondary coils L12 and L22 of transformers T1 and T2 and connected opposite each other with respect to the secondary coil L12 of the transformer T1. A current sensing signal Is is outputted between the diode D6 and the resistor R1 to be applied to the inverter controller 923.

The lamp state sensing unit 940 includes a plurality of lamp state sensing circuits 941–944 connected to lamps L1–L4, respectively, and a reference voltage setting unit 945 commonly connected to the capacitors C12, C22, C32 and C42 and connected to the corresponding lamp state sensing circuit 941–944. The lamp state sensing unit 940 further includes a resistor R4 connected to the lamp state sensing circuits 941–944 and the inerter controller 923. The resistor R4 is connected to a supply voltage VCC, too.

The lamp state sensing circuits 941–944 have substantially the same configuration and the respective lamp state sensing circuit includes a voltage divider DV1-DV4, a diode D1–D4 connected to the divider DV1–DV4 in a forward direction, a capacitor C1-C4 connected between the diode D1–D4 and the ground, and a comparator COM1–COM4 of which a non-inverting terminal (+) is connected to the respective diode D1-D4 and an inverting terminal (−) is connected to the reference voltage setting unit 945. The divider DV1-DV4 includes a pair of resistors R11 and R12, R21 and R22, R31 and R32, and R41 and R42 connected in series between the corresponding lamp L1–L4 and the ground. The comparator COM1-COM4, for example, may have an open collector output. The output terminals of comparators COM1-COM4 are connected to each other to have a wired-OR connection. The output terminals of the comparators COM1–COM4 are also connected to the supply voltage VCC through the resistor R4. Thus, when a state of at least one output voltage of the comparators COM1–COM4 is a low level, a state of the total output voltage of comparators COM1–COM4 with the wired-OR connection is the low level. In this time, the resistor R4 connected to the supply voltage VCC functions as a pull-up resistor which boosts a level of the total output voltage.

The Output voltages of the respective comparators COM1–COM4 outputted through output terminals thereof are summed, to be applied as a drift sensing signal Ip to the inverter controller 923 of the inverter 920.

The reference voltage setting unit 945 includes a divider DV5, a diode D5 connected between the divider DV5 and the inverting terminal (−) of comparators COM1–COM4 in the forward direction, and a capacitor C5 connected between the diode D5 and the ground. The divider DV5 includes a pair of resistors R2 and R3 connected in serial between the capacitors C12, C22, C32, and C42 and the ground.

The operations of the lamp unit 910, the inverter 920, the current sensing unit 930, and the lamp state sensing unit 940 will be described in detail with reference to FIG. 4.

The switching unit 922 of the inverter 920 converts the DC voltage from an external source into an AC voltage (not shown) and applies the AC voltage to the primary coils L11 and L21 of the transformers T1 and T2, respectively.

The transformers T1 and T2 boost up the AC voltage based on the turns ratio of the primary coil L11 and L21 and the secondary coil L12 and L22, respectively and apply the boosted voltages to the lamp unit 910 to light the lamps L1-L4. In detail, high AC voltages are induced in the secondary coils L12 and L22 on the basis of the AC voltage applied to the primary coils L11 and L21, respectively. The induced voltages in the secondary coils L12 and L22 are applied to respective ends of the lamp units 911–914.

At this time, the boosted voltages generated by each transformer T1 and T2 have substantially the same magnitude, but have phases inverted to each other. Thus, the voltages applied to both ends of the respective lamp units 911–914 are two times with respect to the output voltages from the respective transformers T1 and T2. Thereby, each transformer T1 and T2 needs to output a voltage having ½ magnitude compared to the case that one end of a lamp is supplied with the high voltage and the other end of that is connected to the ground.

The ballast capacitors C11, C12, C21, C22, C31, C32, C41, and C42 connected to both ends of the lamps L1–L4 maintain the respective voltages applied to them.

The voltage induced in the secondary coil L22 of the transformer T2 and applied to each capacitor C12, C22, C32, and C42 is divided by the voltage divider DV5 of the reference voltage setting unit 945 of the lamp state sensing unit 940 to be decreased to a predetermined level, half-wave rectified by the diode D5 for rectification to be converted to a DC voltage, and then smoothed by the capacitor C5. The smoothed DC voltage is applied to the inverting terminals (−) of the comparators COM1–COM4 of the respective lamp state sensing circuits 941–944, to be used as a reference voltage of the comparators COM1–COM4. At this time, since the voltage commonly applied to capacitors C12, C22, C32, and C42 is defined depending on an average of the voltages applied to the respective lamps L1–L4, the reference voltage also is defined depending on the average of the voltages. Thus, the reference voltage according to the embodiment of the present invention is not fixed at a predetermined value, but varied based on the average of the voltages applied to the respective lamp L1–L4.

The respective lamp state sensing circuits 941–944 divide the AC voltage applied to the respective lamps L1-L4 through the capacitors C12, C22, C32, and C42 by using the voltage dividers DV1–DV4, to decrease the level of the AC voltages. The AC voltage from each voltage divider DV1–DV4 is half-wave rectified by the rectification diode D1–D4, smoothed by smoothing capacitor C1–C4, respectively, and then is applied to the non-inverting terminal (+) of the comparator COM1–COM4.

When the voltage applied to the non-inverting terminal (+) is larger than a voltage applied to the inverting terminal (−), i.e. the reference voltage, each comparator COM1-COM4 outputs a high level voltage of a high state. On the contrary, when the voltage applied to the non-inverting terminal (+) is smaller than the voltage applied to the inverting terminal (−), each comparator COM1–COM4 outputs a low level voltage of a low state.

As described above, due to the comparators COM1–COM4 with the wired-OR connection for the output terminals, when at least one comparator COM1–COM4 outputs has the low level voltage, the drift voltage sensing signal Ip applied to the inverter controller 923 has the low state.

When the drift voltage sensing signal Ip from the lamp state sensing unit 940 has the low state, the inverter controller 923 determines that an over-current is flowing through at least one lamp L1–L4 and turns off all lamps L1–L4 of the lamp unit 910.

Meanwhile, the induced currents in the secondary coils L12 and L22 of the transformers T1 and T2 flow through the current sensing unit 930. The diode D6 of the current sensing unit 930 half-wave rectifies the induced current flowing via the secondary coil L12 of the transformer T1, the half-wave rectified current flows into ground through the resistor R1. The other diode D7 functions as a pass of an induced current flowing in the reverse direction. Since the rectified current by the diode D6 is proportional to total current of the currents flowing through the respective lamps L1–L4, the rectified current is supplied as the current sensing signal Is to the inverter controller 923. The inverter controller 923 varies a level of a DC control signal which changes the frequency and period etc. of the AC voltage applied to the transforming unit 921 from the switching unit 922, based on the current sensing signal Is. Thus, the total current flowing through the lamps L1–L4 is constant.

Next, the relationship of a leakage current with respect to a voltage applied to a lamp will be described with reference to FIGS. 5 and 6.

Figure 5:
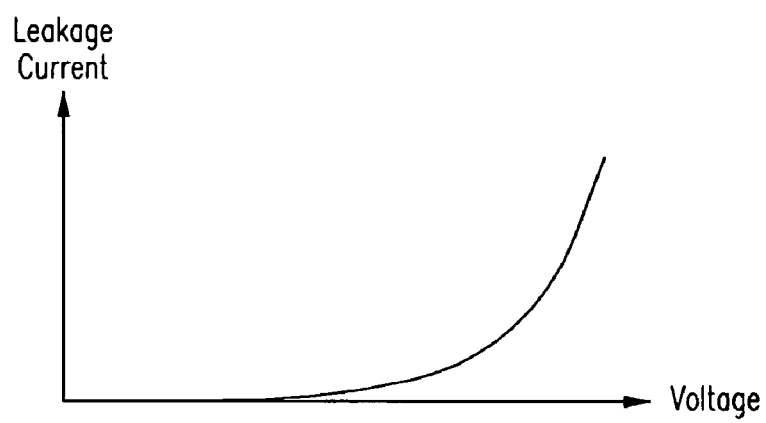
FIG. 5 a graph illustrating the relationship of a leakage current relative to variation of an applied voltage.
Figure 6:
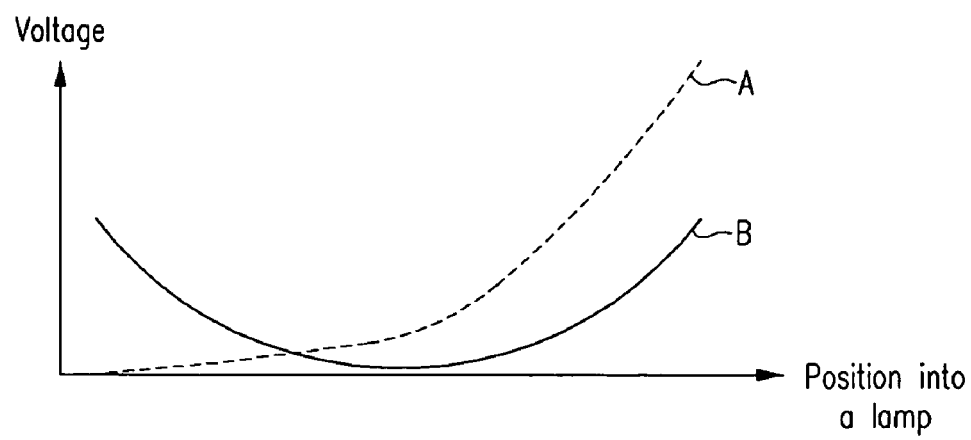
FIG. 6 is a graph illustrating the variation of a voltage with respect to the position into a lamp in a backlight assembly according to an embodiment of the present invention and according to a conventional backlight assembly.

FIG. 5 a graph illustrating the relationship a leakage current relative to variation of an applied voltage, and FIG. 6 is a graph illustrating the variation of a voltage with respect to the position into a lamp of a backlight assembly according to an embodiment of the present invention and according to a conventional backlight assembly.

As shown in FIG. 5, as a voltage applied to a lamp become larger, the amount of a leakage current increases accordingly.

Referring to a curve "A" indicated on FIG. 6, in a conventional backlight assembly which one end of a lamp, hot terminal, is supplied with a high voltage and another end of that, cold terminal, is supplied with a low voltage with an almost ground level, large leakage current is generated on the hot terminal, but almost no leakage current is generated on the cold terminal. Thus, the difference between both ends of the lamp become large and an image quality is deteriorated due to the increased brightness difference between both ends of the lamp.

However, in the embodiment of the present invention, since two AC voltages with the same magnitude and a phase inverted to each other are applied to both ends of the lamp, respectively, as a curve "B" indicated on FIG. 6, a voltage level at the middle portion of the lamp is almost "0." As a result, the magnitude of the voltages of each end of the lamp is almost equal and thereby the amount of the leakage currents generated at each end of the lamp is equal to each other, not causing the brightness difference between both ends of the lamp. Moreover, as described above, since the AC voltages with the inverted phases are applied to both ends of the lamp, respectively, the voltage difference between both ends is almost equal to that of the conventional assembly although voltages with ½ magnitude of the conventional assembly are applied to both ends of the lamp, respectively. Thus, the amount of the leakage currents generated at both ends of the lamps decreases and the interference between adjacent lamps decrease, too, to reduce the drift current flowing through any lamp. In addition, since the voltage outputted from a transformer and applied to the lamp become small, power consumption decreases.

The variation of a reference voltage relative to a voltage applied to both ends of a lamp will be described with reference to FIGS. 7 and 8.

Figure 7:
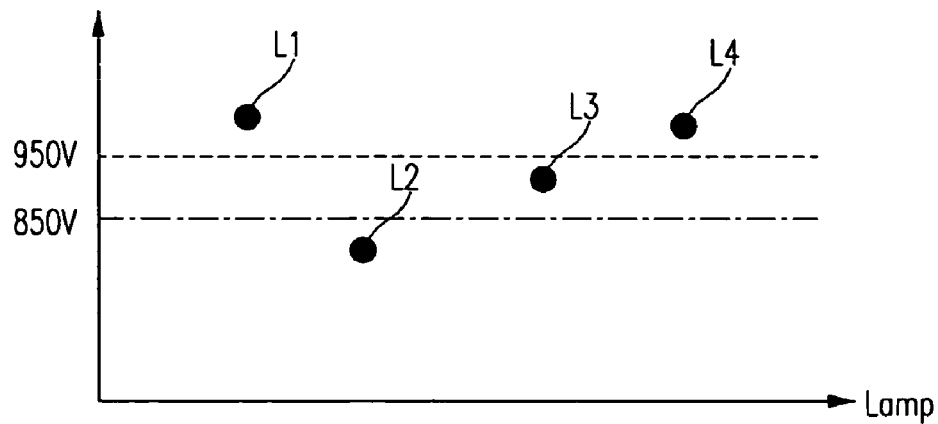
FIGS. 7 and 8 are diagrams illustrating a voltage, an average voltage of each lamp and a reference voltage based on them in a backlight assembly according to an embodiment of the present invention.
Figure 8:
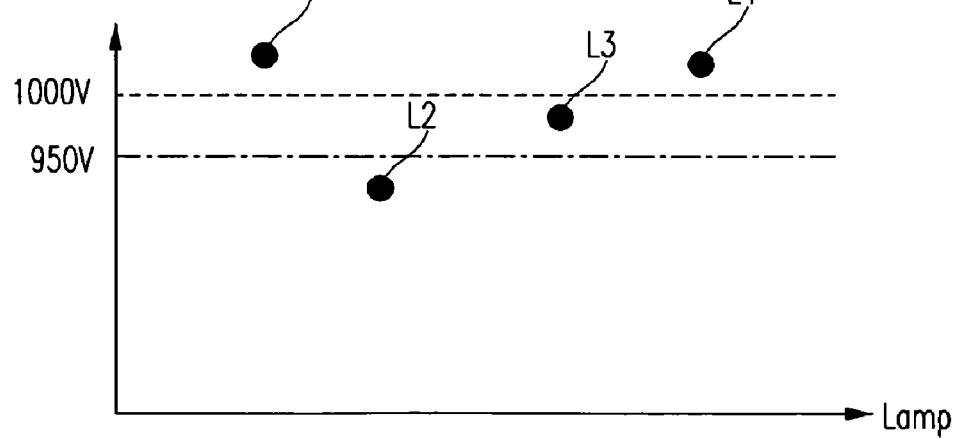

FIGS. 7 and 8 are diagrams illustrating a voltage, an average voltage of each lamp and a reference voltage based on them in backlight assembly according to the embodiment of the present invention. In the embodiment of the present invention, the number of the lamps is 4.

As shown in FIGS. 7 and 8, the voltages applied to both ends of the lamp may be varied depending on operating characteristics such as manufacturers, a driving frequency, and lamp temperature of the lamp. An average voltage of both ends of the lamp is about 900V in FIG. 7, and is about 1,000V in FIG. 8. The reference voltage of the reference voltage setting unit 945 shown in FIG. 4 is obtained by dividing the average voltage. Thus, the reference voltage is varied by adjusting the resistance ratio of the resisters R2 and R3 of the voltage divider DV5 so that the reference voltage is smaller than the average voltage. That is, the reference voltage may be varied to compensate for the difference in the voltages applied to both ends of lamp due to the lamp characteristics. When the average voltage is about 900V, as shown in FIG. 7, the reference voltage is about 850V, and when the average voltage is about 1,000V, as shown in FIG. 8, the reference voltage is about 950V.

According to the embodiments of the present invention, since two AC voltages with inverted phase are applied to both ends of a plurality of lamps, CCFLs, respectively, the lamps are driven by only one transformer, thereby the manufacturing cost and the volume of the inverter assembly decrease.

Since the amount of the leakage currents of both ends of the lamp is equal to each other and the interference between adjacent lamps decreases, stable lamp operation is accomplished and image quality of a display device is improved.

Moreover, since the reference voltage for sensing the over-current is varied based on the lamp operation, reliability of the lamp operation is improved.

While the present invention has been described in detail with reference to the preferred embodiments, it is to be understood that the invention is not limited to the disclosed embodiments, but, on the contrary, is intended to cover various modifications and equivalent arrangements included within the sprit and scope of the appended claims.

What is claimed is:

1. A driving device of a light source for a display device, the light source including a plurality of lamps connected in parallel to each other and each lamp having a first terminal and a second terminal, the device comprising:
   a lamp state sensing unit sensing driving voltages applied to the respective lamps, comparing the sensed driving voltages to a reference voltage, and outputting a lamp state sensing signal having an information informing an over-current state for at least one lamp; and
   an inverter turning the lamps on or off by applying AC voltages to the lamps and controlling the AC voltages based on the lamp state sensing signal,
   wherein the reference voltage is defined based on one of the AC voltages from the inverter and is varied depending on a magnitude of one of the AC voltages applied to the respective lamps.

2. The device of claim 1, wherein the inverter comprises:
   a first transformer applying a first AC voltage of the AC voltages to the first terminals of the lamps; and
   a second transformer applying a second AC voltage of the AC voltages to the second terminals of the lamps,
   wherein the first AC voltage has a phase inverted to that of the second AC voltage.

3. The device of claim 2, wherein the first and second AC voltages have the same magnitude.

4. The device of claim 2, further comprising:
   a plurality of first capacitors connected between the first transformer and the first terminals of the respective lamps; and
   a plurality of second capacitors connected between the second transformer and the second terminals of the respective lamp,
   wherein the first and second capacitors are ballast capacitors.

5. The device of claim 2, further comprising:
   a current sensing unit connected between the first transformer and the second transformer and applying a current sensing signal having a value dependent on an induced voltage induced by the first transformer of the inverter,
   wherein the inverter adjusts the AC voltages applied to lamps based on the current sensing signal from the current sensing unit.

6. The device of claim 5, wherein the current sensing unit comprises a rectifier connected to the first transformer and a resistor connected between the rectifier and a ground node.

7. The device of claim 2, wherein the reference voltage is defined based on the second AC voltage from the second transformer.

8. The device of claim 2, wherein the lamp state sensing unit comprises:
   a reference voltage setting unit connected to the second transformer and defining the reference voltage of which the magnitude is varied depending on an average voltage of the AC voltage applied to the lamps; and
   a plurality of lamp state sensing circuits connected to the respective lamps, comparing the sensed driving voltages of the lamps, of which the magnitude is varied depending on the driving voltages applied to the respective lamps, to the reference voltage, and outputting a plurality of state signals having an information informing the over-current state when the sensed driving voltage is smaller than the reference voltage, respectively.

9. The device of claim 8, wherein the reference voltage setting unit comprises:
a first voltage divider dividing the second AC voltage,
a first rectifier rectifying the second AC voltage divided by the first voltage divider and converting it to the DC voltage; and
a first capacitor smoothing the DC voltage rectified by the first rectifier and outputting it as the reference voltage.

10. The device of claim 9, wherein each lamp state sensing circuit comprises:
a second voltage divider dividing the driving voltage applied to each lamp;
a second rectifier rectifying the driving voltage divided by the second voltage divider to convert it to a DC voltage; and
a comparator receiving the reference voltage from the first capacitor and the DC voltage from the second rectifier.

11. The device of claim 10, wherein the respective lamp state sensing circuits have output terminals connected to a common terminal, and the lamp state sensing signal is outputted through the common terminal.

12. The device of claim 11, wherein the inverter shuts off the AC voltages applied to the lamps when an over-current flows through the at least one lamp.

13. A driving device of a lamp unit for a display device, the lamp unit including a plurality of lamps connected in parallel to each other, the device comprising:
an inverter applying an AC voltage to the lamps and turning on or off the lamps;
a plurality of lamp voltage sensing units sensing a plurality of driving voltages applied to the respective lamps, respectively;
a reference voltage generator commonly connected to the lamps and generating a reference voltage based on an average voltage of the AC voltages applied to the respective lamps; and
a plurality of comparators comparing the reference voltage to a plurality of output voltages from the respective lamp voltage sensing units and outputting a comparison result to the inverter.

14. The device of claim 13, wherein the respective comparators have output terminals and the output terminals have a wired-OR connection.

15. A driving device of a lamp unit for a display device, the lamp unit including a plurality of lamps connected in parallel to each other, and each lamp having a first terminal and a second terminal, the device comprising:
an inverter applying a first AC voltage and a second AC voltage to the first terminals and the second terminals of lamps, respectively and controlling the lamps;
a plurality of first voltage divider connected to the second terminals of the respective lamps;
a plurality of first AC-DC converter connected to the first voltage dividers, respectively;
a second voltage divider commonly connected to the second terminals of the lamps;
a second AC-DC converter connected to the second voltage divider; and
a plurality of comparators having a first input terminal connected to a respective one of the first AC-DC converters and a second input terminal connected to the second AC-DC converter, and the plurality of comparators applying an output voltage to the inverter,
wherein the inverter controls the turning on or off of the lamps depending on the output voltage of the comparators.

16. The device of claim 15, wherein the respective comparators have output terminals and the output terminals have a wired-OR connection.

17. The device of claim 16, wherein the inverter comprises a first transformer generating the first AC voltage and a second transformer generating the second AC voltage.

18. The device of claim 17, wherein the first AC voltage has a phase inverted to that of the second AC voltage and the first AC voltage has a magnitude equal to that of the second AC voltage.

19. The device of claim 18, further comprising: a current sensing unit connected between the first transformer and the second transformer,
wherein the inverter adjusts the first and second AC voltages based on an output from the current sensing.

20. The device of claim 19, wherein the current sensing unit comprises a diode connected to the first transformer and a resistor connected to the diode.

21. The device of claim 15, further comprising: a plurality of first and second capacitors connected to lamps, respectively.

22. The device of claim 15, wherein the first and the second AC-DC converter respectively comprise:
a diode connected to the respective first or the second voltage divider; and
a capacitor connected to the diode.

* * * * *